United States Patent
Dawson et al.

(10) Patent No.: US 7,565,486 B2
(45) Date of Patent: Jul. 21, 2009

(54) METHOD AND APPARATUS FOR HANDLING MULTI-VOLUME DATASETS IN A TAPE STORAGE SYSTEM

(75) Inventors: Erika M. Dawson, Tucson, AZ (US); Gregory T. Kishi, Oro Valley, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 11/235,986

(22) Filed: Sep. 26, 2005

(65) Prior Publication Data

US 2007/0073964 A1    Mar. 29, 2007

(51) Int. Cl.
*G06F 12/08* (2006.01)
(52) U.S. Cl. ............... 711/114; 369/34.01; 711/137
(58) Field of Classification Search .............. None
See application file for complete search history.

(56) References Cited

U.S. PATENT DOCUMENTS

| | | | |
|---|---|---|---|
| 6,067,599 A | 5/2000 | Kishi et al. | |
| 6,269,423 B1 | 7/2001 | Kishi | |
| 6,339,778 B1 | 1/2002 | Kishi | |
| 6,463,513 B1 | 10/2002 | Bish et al. | |
| 6,557,073 B1 | 4/2003 | Fujiwara et al. | |
| 6,742,084 B1 | 5/2004 | Defouw et al. | |
| 6,745,212 B2 | 6/2004 | Kishi et al. | |
| 6,779,058 B2 | 8/2004 | Kishi et al. | |
| 6,816,941 B1 | 11/2004 | Carlson et al. | |
| 2003/0004980 A1 | 1/2003 | Kishi et al. | |
| 2003/0236942 A1 | 12/2003 | Kishi et al. | |
| 2004/0044701 A1 | 3/2004 | Fisher et al. | |
| 2004/0044830 A1 | 3/2004 | Gibble et al. | |
| 2004/0078639 A1 | 4/2004 | Anna et al. | |

OTHER PUBLICATIONS

"Logical Grouping of Data Storage Media in a Library System", IBM Technical Disclosure Bulletin NN921017, Oct. 1992.*

* cited by examiner

*Primary Examiner*—Gary J Portka
(74) *Attorney, Agent, or Firm*—Dillon & Yudell LLP

(57) ABSTRACT

A method and apparatus for handling multi-volume datasets in a tape storage system are disclosed. In response to a write request for a multi-volume dataset, the information of the multi-volume dataset are captured by intercepting and deciphering a set of volume mount commands. Otherwise, the information of the multi-volume dataset are captured by snooping header information from a previous volume listed in a header of the multi-volume dataset. A chain of logical volume names that belongs to the multi-volume dataset is then built. Finally, the chain of logical volume names is then stored in a chain database.

12 Claims, 3 Drawing Sheets

127

| L00001 | KZ0120 | ZZZ990 | ABC123 | | | |
|--------|--------|--------|--------|--------|--------|--------|
| BW3242 | TJK098 | AMND78 | ADF077 | KHLK33 | UYI987 | EQRW38 |
| TX1234 | MDB361 | SMEX32 | | | | |

METHOD AND APPARATUS FOR HANDLING MULTI-VOLUME DATASETS IN A TAPE STORAGE SYSTEM

BACKGROUND OF THE INVENTION

1. Technical Field

The present invention relates to tape storage systems in general. More particularly, the present invention relates to tape storage systems having multi-volume datasets. Still more particularly, the present invention relates to a method and apparatus for handling multi-volume datasets in a tape storage system.

2. Description of Related Art

Virtual tape servers (VTSs) are one of the tape dataset stacking products specifically designed to cater customers demand for an efficient way to manage information stored on magnetic tapes. A VTS system typically includes a host interface, a VTS cache, and an automated library having multiple tape devices.

A VTS system is usually attached to a host computer such as a mainframe computer. When the host computer writes a dataset to the VTS system, the dataset is written to a virtual volume on the VTS system. If a dataset being written to a virtual volume exceeds the capacity of a single virtual volume, the dataset can be written by the host computer to a series of virtual volumes commonly referred to as a multi-volume dataset.

When the host computer reads a virtual volume of a multi-volume dataset from the VTS system, the virtual volume can be retrieved from a VTS cache if the virtual volume is currently resided on the VTS cache. If the virtual volume is not resided on the VTS cache, a storage manager determines which of the magnetic tapes contains the virtual volume. The corresponding magnetic tape is subsequently mounted on one of the tape devices, and the virtual volume is sent from the magnetic tape to the VTS cache and to the host computer. Since tape mounting can be very time-consuming, it is always favorable to have the frequently accessed virtual volumes retained in the VTS cache.

Often, when one virtual volume in a multi-volume dataset is accessed, the other virtual volumes within the same multi-volume dataset will typically be accessed as well. If an application within the host computer is going to access all the virtual volumes in the multi-volume dataset, it would be very advantageous to prestage all the virtual volumes into the VTS cache before they were accessed by the application within the host computer. However, the VTS system generally does not have the knowledge of which virtual volumes belong to a multi-volume dataset; thus, it would be desirable to provide such knowledge to the VTS system.

SUMMARY OF THE INVENTION

In accordance with a preferred embodiment of the present invention, in response to a write request for a multi-volume dataset, the information of the multi-volume dataset are captured by intercepting and deciphering a set of volume mount commands. Otherwise, the information of the multi-volume dataset are captured by snooping header information from a previous volume listed in a header of the multi-volume dataset. A chain of logical volume names that belongs to the multi-volume dataset is then built. Finally, the chain of logical volume names is then stored in a chain database.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 illustrates multiple chains of logical volume names stored in a chain database within the tape storage system from FIG. 1, in accordance with a preferred embodiment of the present invention.

DETAILED DESCRIPTION OF A PREFERRED EMBODIMENT

Figure 1:
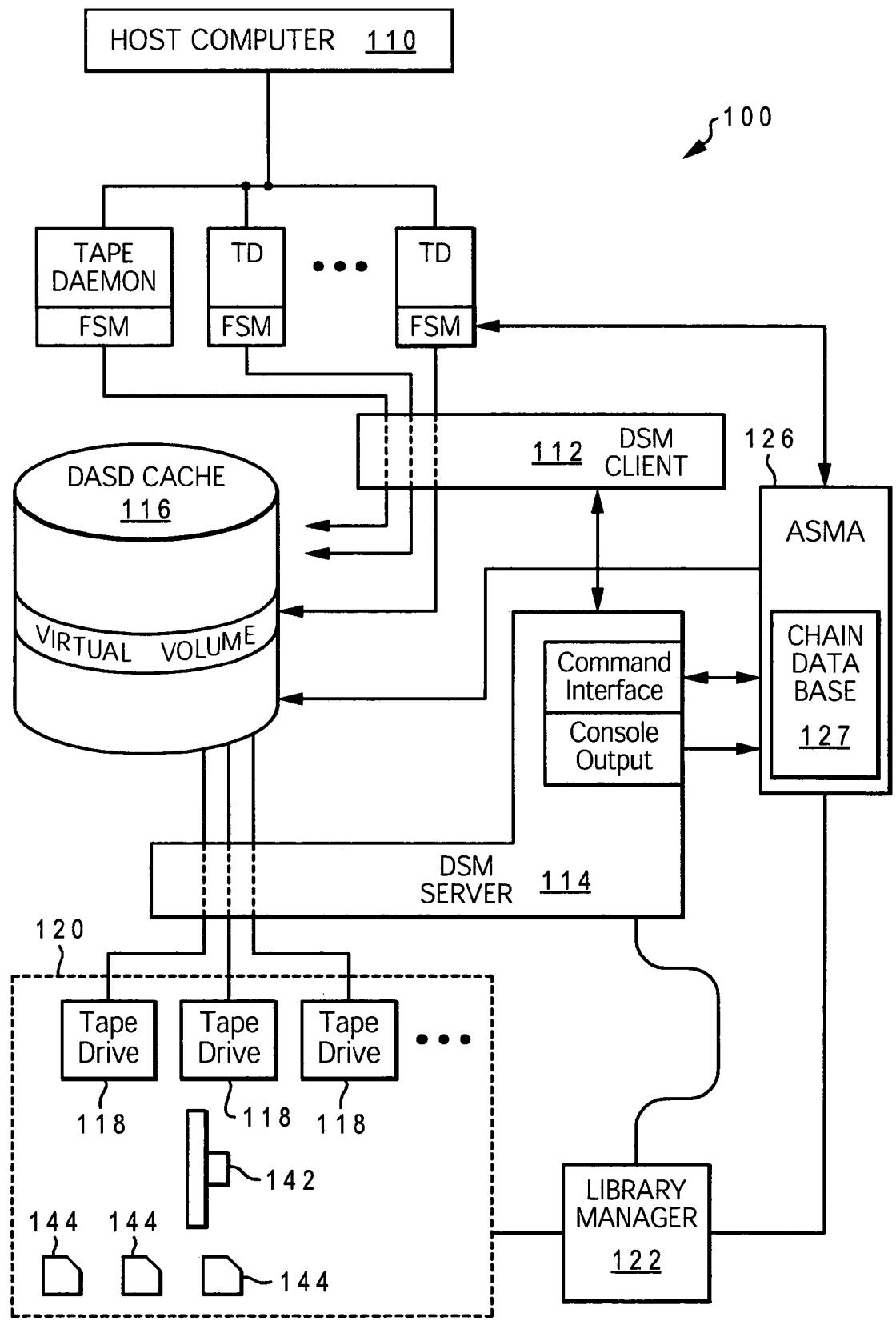
FIG. 1 is a block diagram of a virtual tape server system in which a preferred embodiment of the present invention can be incorporated.

Referring now to the drawings, and specifically to FIG. 1, there is depicted a virtual tape server (VTS) system in which a preferred embodiment of the present invention can be incorporated. As shown, a VTS system 100, which attaches to a host computer 110, includes a distributed storage manager client 112, a distributed storage manager server 114, a direct access storage device (DASD) cache 116, a set of tape drives 118 forming an automated library 120, a library manager 122, and an automatic storage manager administrator 126.

Host computer 110 can write a dataset into a virtual volume within VTS system 100. Sometimes, a dataset can be very large and the dataset has to be written in several virtual volumes known as a multi-volume dataset. Virtual volumes that are frequently accessed by host computer 110 can be stored in DASD cache 116, and virtual volumes that are less frequently accessed by host computer 110 can be stored in tapes 144 accessible by tape drives 118.

Distributed storage manager client 112 sends the frequently accessed virtual volumes to DASD cache 116, and distributed storage manager server 114 moves data between DASD cache 116 and tape drives 118. Library manager 122 controls an accessor 142 that accesses tapes 144 via commands from distributed storage manager server 114.

Quite often, when one virtual volume in a multi-volume dataset is accessed by an application within host computer 110, other virtual volumes of the same multi-volume dataset will also be accessed by the same application within host computer 110. But if some or all of the virtual volumes of the multi-volume dataset are not already in DASD cache 116, they will have to be recalled from one or more of tapes 144. Because the process of mounting tapes 144 is relatively time-consuming, it would be very advantageous to prestage (or preload) all the virtual volumes of the multi-volume dataset into DASD cache 116 before they are accessed by the application within host computer 110, especially when the application is actually going to access all the virtual volumes in the multi-volume dataset.

However, VTS system 100 does not have the knowledge of the relationship between virtual volumes and multi-volume datasets. Thus, VTS system 100 does not know which virtual volume corresponds to what multi-volume dataset until each virtual volume is being accessed by the application within host computer 110. As such, VTS system 100 cannot prestage any of the virtual volumes of a multi-volume dataset into DASD cache 116. Furthermore, even after VTS system 100 has acquired such knowledge and performs prestaging by diligently recalling all the associated virtual volumes of a multi-volume dataset into DASD cache 116 each time a virtual volume is requested, VTS system 100 would have wasted a lot of resources if only a few of the virtual volumes of the multi-volume dataset are actually going to be accessed by the application within host computer 110.

In order for VTS system 100 to be able to intelligently handle multi-volume dataset, the first step is for VTS system 100 to identify each multi-volume dataset by automatically capturing certain information on every multi-volume dataset. VTS system 100 can automatically capture information on multi-volume datasets via one of the following two methods. If a multi-volume dataset is generated by an application within host computer 110 having an Advanced Policy Management enabled, the Library Universal Mount (LUM) for each subsequent mount will contain the name of the first (or previous) virtual volume in the multi-volume dataset as the "clone" source virtual volume. Thus, the first method is to intercept those clone LUM commands, deciphers the clone LUM commands, and then builds a chain of logical volume names that belongs to a multi-volume dataset. The chain of logical volume names should include the previous virtual volume in the chain of logical volume names, and the position of the current virtual volume in the chain of logical volume names. One chain of logical volume names is associated with one multi-volume dataset.

The second method is to "snoop" all headers-build chain list from the previous logical volume listed in the multi-volume dataset header, preferably by using VTS microcode. The headers-build chain list would allow VTS system 100 to build a chain of logical volume names that belong to a multi-volume dataset. Again, the chain of logical volume names should include the previous virtual volume in the chain of logical volume names, and the position of the current virtual volume in the chain of logical volume names.

Chains of logical volume names formed by one of the above-mentioned two method are preferably stored in a chain database 127 within automatic storage manager administrator 126. With reference now to FIG. 2, there is graphically illustrated an example of multiple chains of logical volume names stored in chain database 127, in accordance with a preferred embodiment of the present invention. As shown, chain database 127 includes multiple rows, and preferably, each row contains only one chain of logical volume names. For example, the first row includes volume names L00001, KZ0120, ZZZ990, and ABC123; the second row includes volume names BW3242, TJK098, AMND78, ADF0777, KHLK33, UYI987, and EQRW38. Statistical information regarding the number of access to all virtual volumes within each multi-volume dataset are also kept in chain database 127, and the usage of such statistical information will be further described in details.

Figure 3:
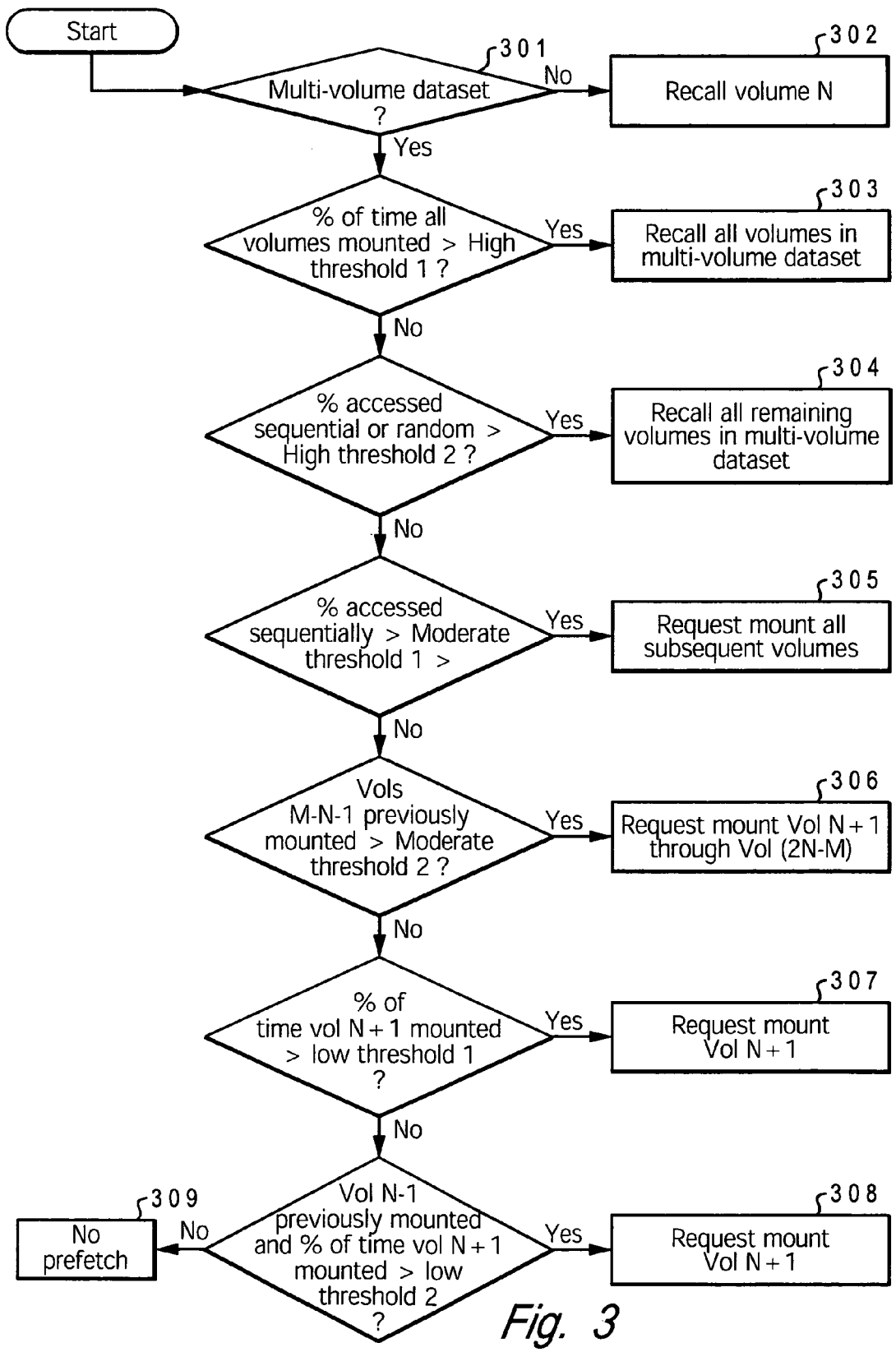
FIG. 3 is a high-level logic flow diagram of a method for performing prestaging within the tape storage system from FIG. 1, in accordance with a preferred embodiment of the present invention.

After VTS system 100 has identified every multi-volume dataset, VTS system 100 is ready to perform prestaging in response to an access request to any of the multi-volume datasets stored within VTS system 100. Referring now to FIG. 3, there is depicted a high-level logic flow diagram of a method for performing prestaging, in accordance with a preferred embodiment of the present invention. In response to an access request for a virtual volume N by host computer 110 (from FIG. 1), a determination is made as to whether or not virtual volume N belongs to a multi-volume dataset by using chain database 127 (from FIG. 1), as shown in block 301. If virtual volume N does not belong to a multi-volume dataset, then virtual volume N is recalled, as depicted in block 302.

However, if virtual volume N belongs to a multi-volume dataset, a determination is made as to the percentage of time all virtual volumes in the multi-volume dataset were accessed when virtual volume N was requested previously. If the percentage of time is higher than a first high threshold (such as 90%), then all virtual volumes in the multi-volume dataset are recalled from the tapes and sent to DASD cache 116 (from FIG. 1), if they are not already in DASD cache 116, as shown in block 303.

Otherwise if the percentage of time is not higher than the first high threshold, then a determination is made as to the percentage of time virtual volumes within the multi-volume dataset were accessed randomly or sequentially when virtual volume N was requested previously. If the percentage of time is higher than a second high threshold (such as 80%), then all virtual volumes in the multi-volume dataset are recalled from the tapes and sent to DASD cache 116 if they are not already in DASD cache 116, as shown in block 304.

Otherwise if the percentage of time is not higher than the second high threshold, then a determination is made as to the percentage of time virtual volumes within the multi-volume dataset were accessed sequentially when virtual volume N was requested previously. If the percentage of time is higher than a first moderate threshold (such as 70%), then all virtual volumes subsequently to virtual volume N in the multi-volume dataset are recalled from the tapes and sent to DASD cache 116 if they are not already in DASD cache 116, as depicted in block 305.

Otherwise if the percentage of time is not higher than the first moderate threshold, then a determination is made as to the percentage of time virtual volume N–M–1 within the multi-volume dataset was accessed when virtual volume N was requested previously. If the percentage of time is higher than a second moderate threshold (such as 60%), then virtual volumes N+1 through 2N–M in the multi-volume dataset are recalled from the tapes and sent to DASD cache 116 if they are not already in DASD cache 116, as shown in block 306.

Otherwise if the percentage of time is not higher than the second moderate threshold, then a determination is made as to the percentage of time virtual volume N+1 within the multi-volume dataset was accessed when virtual volume N was requested previously. If the percentage of time is higher than a first low threshold (such as 50%), then virtual volume N+1 in the multi-volume dataset is recalled from the tapes and sent to DASD cache 116 if it is not already in DASD cache 116, as depicted in block 307.

Otherwise if the percentage of time is not higher than the first low threshold, then a determination is made as to the percentage of time virtual volume N–1 within the multi-volume dataset was accessed when virtual volume N was requested previously after virtual volume N–1 had been mounted. If the percentage of time is higher than a second low threshold (such as 50%), then virtual volume N+1 in the multi-volume dataset is recalled from the tapes and sent to DASD cache 116 if it is not already in DASD cache 116, as depicted in block 308. If the percentage of time is not higher than the second low threshold, then no prestaging is performed, as depicted in block 309.

As has been described, the present invention provides a method and apparatus for handling multi-volume datasets within a tape storage system.

It is also important to note that although the present invention has been described in the context of hardware, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for handling multi-volume datasets within a tape storage system, said method comprising:
   building a chain of logical volume names that belongs to a multi-volume dataset by utilizing a plurality of clone LUM volume mount commands, wherein each of said plurality of clone LUM volume mount commands is captured in response to an access request for a virtual volume by a host computer, wherein said virtual volume belongs to said multi-volume dataset generated by an application within said host computer having an Advanced Policy Management enabled such that a Library Universal Mount (LUM) for each subsequent mount for said access request contains a name of a first or previous virtual volume in said multi-volume dataset as a "clone" source virtual volume;
   storing said chain of logical volume names in a chain database within an automatic storage management administrator of said tape storage system;
   in response to an access request for a virtual volume N within said multi-volume dataset, determining whether or not the percentage of time for all virtual volumes in said multi-volume dataset to be accessed when said virtual volume N was previously requested is greater than a first high threshold; and
   in a determination that the percentage of time for all virtual volumes in said multi-volume dataset to be accessed when said virtual volume N was previously requested is greater than said first high threshold, recalling all virtual volumes in said multi-volume dataset.

2. The method of claim 1, wherein said chain of logical volume names includes the position of a previous virtual volume name and the position of a current virtual volume name.

3. The method of claim 1, wherein said method further includes
   in a determination that the percentage of time for all virtual volumes in said multi-volume dataset to be accessed when said virtual volume N was requested previously is greater than a first high threshold, determining whether or not the percentage of time for all virtual volumes within said multi-volume dataset to be accessed randomly or sequentially when said virtual volume N was previously requested is greater than a second high threshold; and
   in a determination that the percentage of time for all virtual volumes within said multi-volume dataset to be accessed randomly or sequentially when said virtual volume N was previously requested is greater than a second high threshold, recalling all remaining virtual volumes in said multi-volume dataset.

4. The method of claim 3, wherein said method further includes
   in a determination that the percentage of time for all virtual volumes within said multi-volume dataset to be accessed randomly or sequentially when said virtual volume N was previously requested is not greater than said second high threshold, determining whether or not the percentage of time for all virtual volumes within said multi-volume dataset to be accessed sequentially when said virtual volume N was previously requested is greater than a moderate threshold; and
   in a determination that the percentage of time for all virtual volumes within said multi-volume dataset to be accessed sequentially when said virtual volume N was previously requested is greater than said moderate threshold, recalling all virtual volumes subsequent to said virtual volume N in said multi-volume dataset.

5. A tape storage system, comprising:
   means for building a chain of logical volume names that belongs to a multi-volume dataset by utilizing a plurality of clone LUM volume mount commands, wherein each of said plurality of clone LUM volume mount commands is captured in response to an access request for a virtual volume by a host computer, wherein said virtual volume belongs to said multi-volume dataset generated by an application within said host computer having an Advanced Policy Management enabled such that a Library Universal Mount (LUM) for each subsequent mount for said access request contains a name of a first or previous virtual volume in said multi-volume dataset as a "clone" source virtual volume;
   a chain database within an automatic storage management administrator for storing said chain of logical volume names in a chain database;
   means for, in response to an access request for a virtual volume N within said multi-volume dataset, determining whether or not the percentage of time for all virtual volumes in said multi-volume dataset to be accessed when said virtual volume N was previously requested is greater than a first high threshold; and
   in a determination that the percentage of time for all virtual volumes in said multi-volume dataset to be accessed when said virtual volume N was previously requested is greater than said first high threshold, recalling all virtual volumes in said multi-volume dataset.

6. The tape storage system of claim 5, wherein said chain of logical volume names includes the position of a previous virtual volume name and the position of a current virtual volume name.

7. The tape storage system of claim 5, wherein said tape storage system further includes
   means for in a determination that the percentage of time for all virtual volumes in said multi-volume dataset to be accessed when said virtual volume N was requested previously is not greater than a first high threshold, determining whether or not the percentage of time for all virtual volumes within said multi-volume dataset to be accessed randomly or sequentially when said virtual volume N was previously reciuested is greater than a second high threshold; and
   means for, in a determination that the percentage of time for all virtual volumes within said multi-volume dataset to be accessed randomly or sequentially when said virtual volume N was previously requested is greater than a second high threshold, recalling all remaining virtual volumes in said multi-volume dataset.

8. The tape storage system of claim 7, wherein said tape storage system further includes
   means for, in a determination that the percentage of time for all virtual volumes within said multi-volume dataset to be accessed randomly or sequentially when said virtual volume N was previously requested is not greater than said second high threshold, determining whether or not the percentage of time for all virtual volumes within said multi-volume dataset to be accessed sequentially when said virtual volume N was previously requested is greater than a moderate threshold; and means for, in a determination that the percentage of time for all virtual volumes within said multi-volume dataset to be accessed sequentially when said virtual volume N was previously requested is greater than said moderate threshold, recalling all virtual volumes subsequent to said virtual volume N in said multi-volume dataset.

9. A computer usable medium having a computer program product residing on a recordable medium for handling multi-volume datasets within a tape storage system, said computer usable medium comprising:

computer program code for building a chain of logical volume names that belongs to a multi-volume dataset by utilizing a plurality of clone LUM volume mount commands, wherein each of said plurality of clone LUM volume mount commands is captured in response to an access request for a virtual volume by a host computer, wherein said virtual volume belongs to said multi-volume data set generated by an application within said host computer having an Advanced Policy Management enabled such that a Library Universal Mount (LUM) for each subsequent mount for said access request contains a name of a first or previous virtual volume in said multi-volume dataset as a "clone" source virtual volume;

computer program code for storing said chain of logical volume names in a chain database within an automatic storacie management administrator of said tape storage system;

computer program code for, in response to an access request for a virtual volume N within said multi-volume dataset, determining whether or not the percentage of time for all virtual volumes in said multi-volume dataset to be accessed when said virtual volume N was previously requested is greater than a first high threshold; and computer program code for, in a determination that the percentage of time for all virtual volumes in said multi-volume dataset to be accessed when said virtual volume N was previously requested is greater than said first high threshold, recalling all virtual volumes in said multi-volume dataset.

10. The computer usable medium of claim 9, wherein said chain of logical volume names includes the position of a previous virtual volume name and the position of a current virtual volume name.

11. The computer usable medium of claim 9, wherein said computer usable medium further includes computer program code for, in a determination that the percentage of time for all virtual volumes in said multi-volume dataset to be accessed when said virtual volume N was requested previously is greater than a first high threshold, determining whether or not the percentage of time for all virtual volumes within said multi-volume dataset to be accessed randomly or sequentially when said virtual volume N was previously requested is greater than a second high threshold; and computer program code for, in a determination that the percentage of time for all virtual volumes within said multi-volume dataset to be accessed randomly or sequentially when said virtual volume N was previously reciuested is greater than a second high threshold, recalling all remaining virtual volumes in said multi-volume dataset.

12. The computer usable medium of claim 11, wherein said computer usable medium further includes computer program code for, in a determination that the percentage of time for all virtual volumes within said multi-volume dataset to be accessed randomly or sequentially when said virtual volume N was previously requested is not greater than said second high threshold, determining whether or not the percentage of time for all virtual volumes within said multi-volume dataset to be accessed sequentially when said virtual volume N was previously requested is greater than a moderate threshold; and computer program code for, in a determination that the percentage of time for all virtual volumes within said multi-volume dataset to be accessed sequentially when said virtual volume N was previously requested is greater than said moderate threshold, recalling all virtual volumes subsequent to said virtual volume N in said multi-volume dataset.

* * * * *